(12) United States Patent
Sesto

(10) Patent No.: US 8,676,183 B2
(45) Date of Patent: Mar. 18, 2014

(54) METHOD AND APPARATUS FOR CONTROLLING DE-SUBSCRIPTION OF A MASTER DEVICE AT A BASE STATION

(75) Inventor: Vincenzo Sesto, Delray Beach, FL (US)

(73) Assignee: OpenPeak Inc., Boca Raton, FL (US)

( * ) Notice: Subject to any disclaimer, the term of this patent is extended or adjusted under 35 U.S.C. 154(b) by 461 days.

(21) Appl. No.: 12/980,512

(22) Filed: Dec. 29, 2010

(65) Prior Publication Data

US 2012/0172024 A1 Jul. 5, 2012

(51) Int. Cl.
*H04M 3/00* (2006.01)
*H04M 1/725* (2006.01)
*H04W 4/00* (2009.01)

(52) U.S. Cl.
USPC .............. 455/419; 455/426.1; 379/142.12

(58) Field of Classification Search
USPC ............ 379/142.12; 455/426.1, 418–420, 455/435.1; 715/864
See application file for complete search history.

(56) References Cited

U.S. PATENT DOCUMENTS

| | | | |
|---|---|---|---|
| 5,893,032 A * | 4/1999 | Maeda et al. | 455/412.1 |
| 6,035,204 A * | 3/2000 | Lee | 455/462 |
| 6,085,080 A * | 7/2000 | Rahikainen et al. | 455/403 |
| 6,266,159 B1 * | 7/2001 | Otsuka et al. | 358/405 |
| 6,574,452 B1 * | 6/2003 | Morvan et al. | 455/11.1 |
| 6,671,509 B1 * | 12/2003 | Tanaka et al. | 455/419 |
| 6,879,830 B1 * | 4/2005 | Vollmer et al. | 455/442 |
| 7,079,822 B2 * | 7/2006 | Gunji et al. | 455/186.1 |
| 2002/0115479 A1 * | 8/2002 | Tischler | 455/568 |
| 2003/0050025 A1 * | 3/2003 | Gunji et al. | 455/168.1 |
| 2004/0090944 A1 * | 5/2004 | Ueno | 370/338 |
| 2005/0260973 A1 * | 11/2005 | van de Groenendaal | 455/411 |
| 2007/0123256 A1 * | 5/2007 | Whitesell et al. | 455/435.1 |
| 2009/0138867 A1 * | 5/2009 | Bambach et al. | 717/171 |
| 2010/0110945 A1 * | 5/2010 | Koskela et al. | 370/310 |
| 2010/0161794 A1 * | 6/2010 | Horn et al. | 709/224 |

* cited by examiner

Primary Examiner — Matthew Sams

(57) ABSTRACT

A master device transmits a de-subscription command to a base station with which it is subscribed. The de-subscription command indicates the master device intends to de-subscribe itself, which requires resolution of a conflict handling process. Upon resolution of the conflict handling process, the base station de-subscribes the master device.

24 Claims, 3 Drawing Sheets

METHOD AND APPARATUS FOR CONTROLLING DE-SUBSCRIPTION OF A MASTER DEVICE AT A BASE STATION

TECHNICAL FIELD

The description herein relates generally to cordless telephone systems, and more particularly to master mode operation of a telephone handset where the handset operates similarly to a remote control of the associated base station.

BACKGROUND

Cordless telephone systems are widely used in residential and small office environments. A cordless telephone replaces a standard wired phone set where the phone is directly connected to a telephone line by, for example, a twisted wire pair. In a cordless phone, or more generally, a local wireless telephone system, a base station interfaces with a telephone system, and provides a wireless radio interface for a corresponding wireless handset.

As with many types of electronics, local wireless telephony systems have evolved from relatively simple cordless systems to increasingly more complex and sophisticated systems that can perform additional functions and allow users to customize the system and handsets. One way of accessing and setting up system preferences and handset access control is to allow a handset to operate as in master mode. A handset operating as a master device in master mode acts somewhat like a remote control, where the handset interface provides a user with input and output means to interact with the base station over the local wireless telephony interface to view and control, set, re-set, configure, etc. various aspects of the system.

As popularity of these systems has grown, industry and governments have standardized aspects of these systems. In particular, the radio air interface has been standardized, and several different standards exist that define radio interface aspects, such as operating frequencies, frequency bands, channel frequency bandwidth, modulation technique, power levels, and so on. Standardization can allow expansion of systems, where, for example, a system sold with one handset can be configured to support multiple handsets, where each handset registers or subscribes to the same base station, allowing any one of the subscribed handsets to operate with the base station. Registration allows the base station to identify subscribed handsets so as not to interact with non-registered handsets, which could otherwise allow unauthorized access to the telephone service through the base station. As such, there is an ever present need for increased functionality and control of such systems.

SUMMARY

An embodiment includes a method of controlling de-subscription in a local wireless telephony system. The embodiment can commence by receiving, at a base station of the local wireless telephony system over a link of a local wireless telephony interface of the base station, a request to operate as a master device from a remote telephony device that is subscribed to the base station. The base station can then transmit a grant to operate as a master device to the remote telephony device from the base station over the local wireless telephony interface and recording an indication at the base station that the remote telephony device is a master device. A command can be received from the master device at the base station, and determining that the command includes a de-subscription command and includes a de-subscription target device identifier that is the same as a master device identifier of the master device. The method can proceed by resolving a conflict handling process at the base station responsive to determining the de-subscription target device identifier and the master device identifier are the same. The conflict handling process generally prevents a master device from being de-subscribed until it is successfully resolved. The method can be further commenced by de-subscribing the master device from the base station subsequent to resolving the conflict handling process.

Another embodiment includes a base station of a local wireless telephony system, which comprises a controller operable to execute instructions contained in firmware of the base station, a transceiver operably connected to the controller, which establishes a local wireless telephony interface, and a registry operable to record identifiers of remote telephony device that are subscribed to the base station. The firmware contains instruction code for a conflict handling process, which is invoked up the base station receiving a de-subscription command from a master device indicating the master device is attempting to de-subscribe itself. Upon successful resolution of the conflict handling process, the base station de-subscribes the master device from the base station.

Another embodiment includes a method of de-subscribing a remote telephony device operating as a master device from a base station, and commences by receiving a command sequence at the base station from the master device, determining at the base station that the command sequence includes a de-subscription command, and determining at the base station that a target identifier of the de-subscription command is the same as an identifier of the master device. The method can then commence by resolving a conflict handling process responsive to determining the target identifier of the de-subscription command is the same as the identifier of the master device, and deleting the identifier of the master device from a subscription registry of the base station.

In another embodiment a remote telephony device includes a controller, a transceiver operably coupled to the controller and operable to communicate with a base station over a local wireless telephony interface, and firmware operably coupled to the controller and containing instruction code for operating the remote telephony device in a master mode. The remote telephony device, while operating in the master mode issues a de-subscription command to the base station, the de-subscription command targeting the remote telephony device, upon an indication that the de-subscription command has been granted the remote telephony device deletes an identifier corresponding to the base station from a subscribed base station identifier memory location in the remote telephony device.

BRIEF DESCRIPTION OF THE DRAWINGS

There are shown in the drawings, embodiments which are presently preferred, it being understood, however, that the claims are not limited to the precise arrangements and instrumentalities shown.

DETAILED DESCRIPTION

While the specification concludes with claims defining features that are regarded as novel, it is believed that the claims will be better understood from a consideration of the description in conjunction with the drawings. As required, detailed embodiments are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claims in virtually any appropriately detailed structure. Further, the terms and phrases used herein are not intended to be limiting but rather to provide an understandable description.

Figure 1:
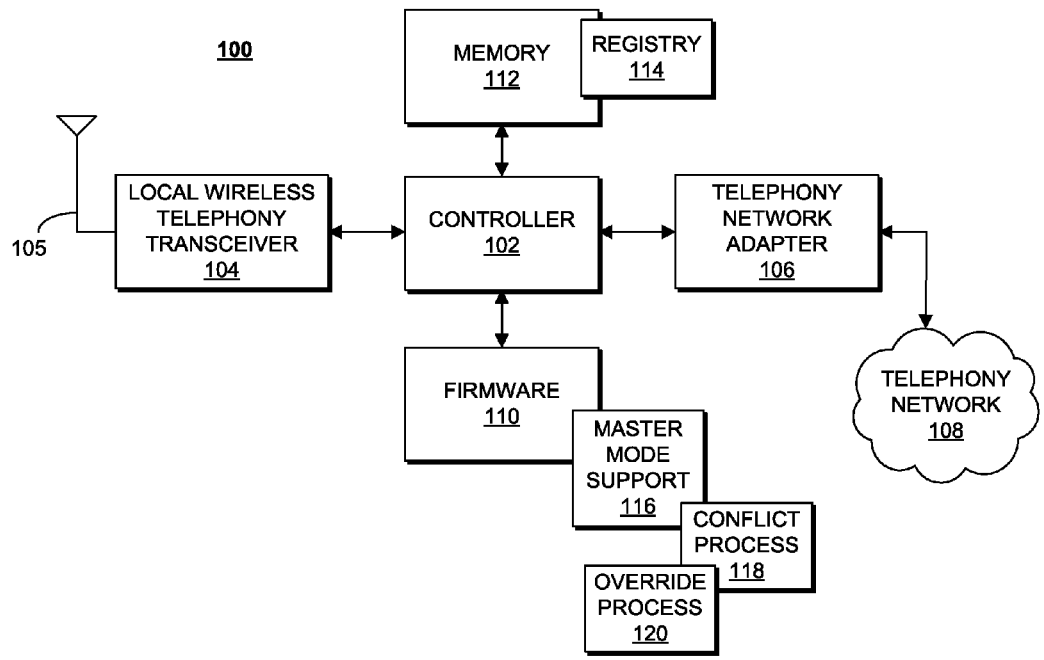
FIG. 1 shows a block schematic diagram of a base station for a local wireless telephony system, in accordance with an embodiment.

Referring to FIG. 1, there is shown a block schematic diagram of a base station 100 for a local wireless telephony system, in accordance with an embodiment. The base station 100 is generally a fixed station that connects to a telephone network, and provided a local wireless telephony interface so that remote devices can access the telephone network for telephone calls via the base station, among other functions the base station can provide. The base station 100 includes a controller 102 that controls operation of the base station 100. The controller 102 can be a microprocessor or microcontroller that operates according to instruction code designed in accordance with teachings herein. The controller 102 interfaces with a local wireless telephony transceiver 104 that provides a local wireless telephony interface. The transceiver 104 includes circuitry and components for frequency generation and control, modulation and demodulation, amplification, filtering, and so on, as is well known. The transceiver 104 includes a transmitter for transmitting signals to remote wireless telephony devices, and a receiver for receiving signals from the device. The signals conform to a standardized protocol or air interface that specifies channel characteristics such as carrier frequency, modulation type, channel bandwidth, timing, and so on. In one embodiment, the local wireless telephony interface can be substantially in conformance with the interface specified by the Digital Enhanced Cordless Telephone (DECT) standard of the European Telephony Standards Institute (ETSI).

The controller 102 is further interfaced with a telephony network adapter 106 to access a telephony network 108. The telephony network 108 can be a public switched telephone network (PSTN), an integrated services digital network (ISDN), private branch exchange network (PBX), or other similar telephony networks. The telephony network adapter 106 is designed to interface with the telephony network 108 and transmit and receive signals to and from, respectively, the telephony network. So, for example, if the telephony network 108 uses a Plain Old Telephone Service (POTS) interface, the line to the network 108 may be a twisted pair conductor and use analog signaling, in which case the network adapter 106 should be able to convert digital signals from the base station 100 to appropriate analog signals for the POTS interface, and vice versa.

The controller 102 operates according to instruction code stored in firmware 110, which can be interfaced to the controller 102 via a conventional bus. The firmware 110 is a machine readable storage medium that is non-transitory, meaning that information stored therein persists after power is removed from the memory. The memory can be a read only memory (ROM) or a re-programmable memory such as an electrically erasable programmable read only memory (EEPROM), or any other such persistent memory. Generally, upon the base station 100 turning on or being powered up, the controller 102 fetches instructions from the firmware 110 and begins executing the instructions.

In the process of executing instructions upon powering up, the controller 102, responsive to the instruction code, can establish certain data structures in a memory 112. The memory 112 is also a machine readable storage medium and can include both volatile and non-volatile memory, such as random access memory (RAM), flash memory, and other re-usable memory elements. In addition to runtime variables and other data structure instantiations that can be contained in the memory 112, the memory can also contain a registry 114. The registry 114 contains identification(s) of remote telephony devices which are registered with the base station 100. A device that is registered by the base station 100 may be provided service by the base station 100. Unregistered devices may probably not be provided service by the base station 100, except to allow unregistered devices to register with the base station 100. The registry 114 can be optionally maintained in firmware memory 110, or in another memory device interfaced with and addressable by the controller 102. The registry 114 can also be used to indicate which of the subscribing base stations, if any, are operating as a master device.

In operation, the base station 100 establishes a local wireless telephony interface via radio communication in the vicinity of the base station 100 to provide one or both of telephony and data services to remote telephony devices that are registered with the base station 100, as indicated in the registry 114. The base station 100 supports master mode operation of a handset using master mode support code 116 of the firmware 110. The term "master mode" is defined as a mode of operation of a remote telephony device where the remote telephony device operates as a user control for controlling aspects of a base station. The term "master device" is defined as a remote telephony device operating in master mode. In one embodiment, when operating as a master device, user input at the master device can be sent to the base station 100, and acknowledged by transmitting the input back to the master device, which then displays the echoed input. For example, if the user pressed the "5" button, the code for the "5" button is transmitted to the base station 100, which in turn transmits it back to the master device. The master device, upon receiving the "5" code then displays a "5" character on a display. The base station 100 can buffer input from the master device until a complete command is indicated, whereupon the base station 100 can then process the command, or advance the state of a command process with each received input. The master state operation can be maintained in memory 112 during a master mode operation.

During master mode operation, the master device can attempt to de-subscribe itself from the base station 100. Conventionally, a conflict handling process 118 determines that the identifier of the master device and the identifier provided by the master device as the target of the de-subscribe command are the same, and prevents such operation. However, according to embodiments, an override process 120 can intercept the de-subscribe command and override the conflict handling process 118.

Figure 2:
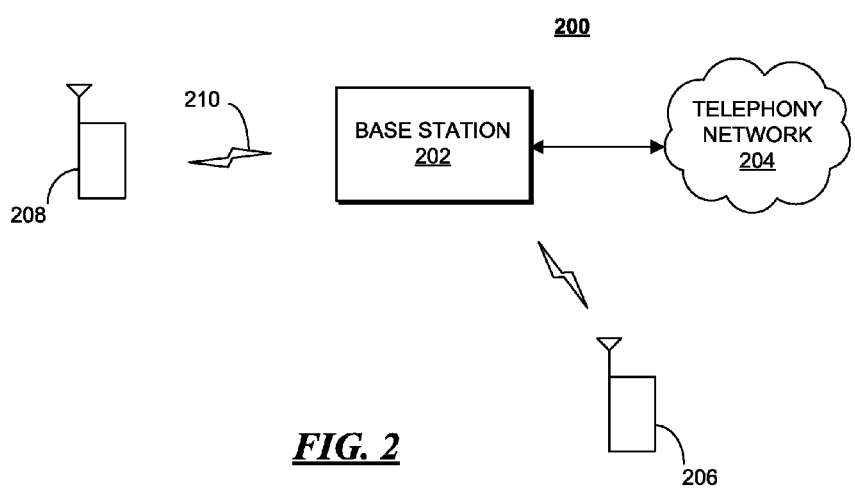
FIG. 2 shows a local wireless telephone system, in accordance with an embodiment.

Referring now to FIG. 2, there is shown a local wireless telephone system 200, in accordance with an embodiment. The local wireless telephony system includes a base station 202 and one or more remote telephony devices 206, 208 and allows users of the remote telephony devices to make telephone calls using the remote telephony devices 206, 208. But while the interface between the base station 202 and the remote telephony devices 206, 208 is a wireless radio interface, the interface generally does not support mobility. That is, if a remote telephony device 206, 208 moves out of radio range of the base station 202 to which it is subscribed, it will cease to be able to provide telephony service, even if other base stations are within radio range. In a local wireless telephony system, the remote telephony devices generally do not roam or hand off to different base stations. A remote telephony device 206, 208 generally includes the audio components necessary to facilitate a full duplex conversation carried on a user of the remote telephony device 206, 208 and a called party. As such the remote telephony devices 206, 208 generally have a microphone and an earpiece speaker, and include the necessary radio and control circuitry for communicating over radio links with the base station in a manner dictated by the local wireless telephony interface. The base station 202 provides an interface to a telephone network 204. The base station 202 can be substantially that as illustrated in FIG. 1, and the telephone network 204 can be substantially the same as telephone network 108 of FIG. 1. The base station 202 provides a local wireless telephony interface for remote telephony devices 206, 208, which are registered or subscribed to the base station 202. The registration process can be performed by any of a variety of known processes; some systems require the registering remote telephony device 206, 208 to be electrically connected to the base station 202, such as by placing the remote telephony device 206, 208 in a charger pocket of the base station 202, or some other means of direct connection. Alternatively the registration can be performed over the local wireless telephony interface, such as by entering a password at the remote telephony device 206, 208, or by accepting the registration request at controls of the base station 202, or via another remote telephony device 206, 208 operating in master mode, for example.

Once registered, one of the remote telephony devices 206, 208 can commence master mode operation. For example, remote telephony device 208 can request master mode operation over a link 210 of the local wireless telephony interface. The link 210 allows the remote telephony device 208 to communicate with the base station 202. A user of the remote telephony device 208 can enter a command sequence or otherwise provide input, which is transmitted to the base station 202 indicating that master mode operation is being requested. The base station 202 can check its registry to determine if any other device is operating in master mode, and if not, grant the request, whereupon the remote telephony device 208 then operates as a master device. The link 210 persists while the remote telephony device/master device 208 then commences master mode operation. The device 208, operating as a master device, operates as a remote control of the base station 202. For example, the master device 208 can command the base station 202 to take various actions with regard to remote telephony device 206, such as de-subscribe device 206, transfer data such as a file to device 206, command device 206 to change its ringer settings, and so on.

In one implementation of master mode, the user of the master device 208 presses buttons on the master device 208. Each button press is detected by the master device 208, and information corresponding to the detected button is transmitted to the base station 202. The master device 208 does not display the detected button press to the user; rather the base station 202 receives the button press information, and repeats or echoes the information back to the master device 208 over the link 210. The echoed information can then be presented graphically to the user of the master device 208, confirming that the base station 202 received the correct button press information. Although master device 208 does not directly display the button press information, as would occur, for example, when pre-dialing a telephone number, the information can be transmitted and echoed so fast that, to a user, there is no appreciable difference.

When the user of the master device 208 wishes to de-subscribe the master device 208, the user can press a predefined command sequence indicating the desired de-subscription operation. The command sequence can be generated by a series of button presses, which are parsed by the base station 202 as they are received, and a command state can be maintained as each new button press is received at the base station 202. Each successive button press indicates a further definition of the command. For example, a menu can be presented on the master device 208, with high level, general categories of activities, each associated with a number. Pressing one of the numbers on a keypad of the master device 208 selects the corresponding menu item, which can then bring up a sub-menu with different options again ordered and presented with associated numbers. The process continues until, for example, a command and all necessary information required by the base station 202 to execute the command is provided. As the user of the master device 208 presses buttons for the de-subscription activity, the base station 202 can recognize the de-subscribe command and in response transmit the identifiers or aliases of all remote telephony devices that are presently subscribed or registered with the base station 202 to allow the user of the master device 208 to select one as the target of the de-subscribe command. Alternatively, the user can simply include the identifier of the target of the de-subscribe command. When the target identifier and the master device identifier are the same, a conflict handling process operates to ensure that the user does not inadvertently de-subscribe the master device 208. When the conflict handling process is appropriately overridden, the master device 208 is then de-subscribed. The master device 208 can then continue to operate as a master device 208 while the link remains up, or the base station 202 can terminate the link and subsequently ignore the remote telephony device that was acting as the master device 208.

Figure 3:
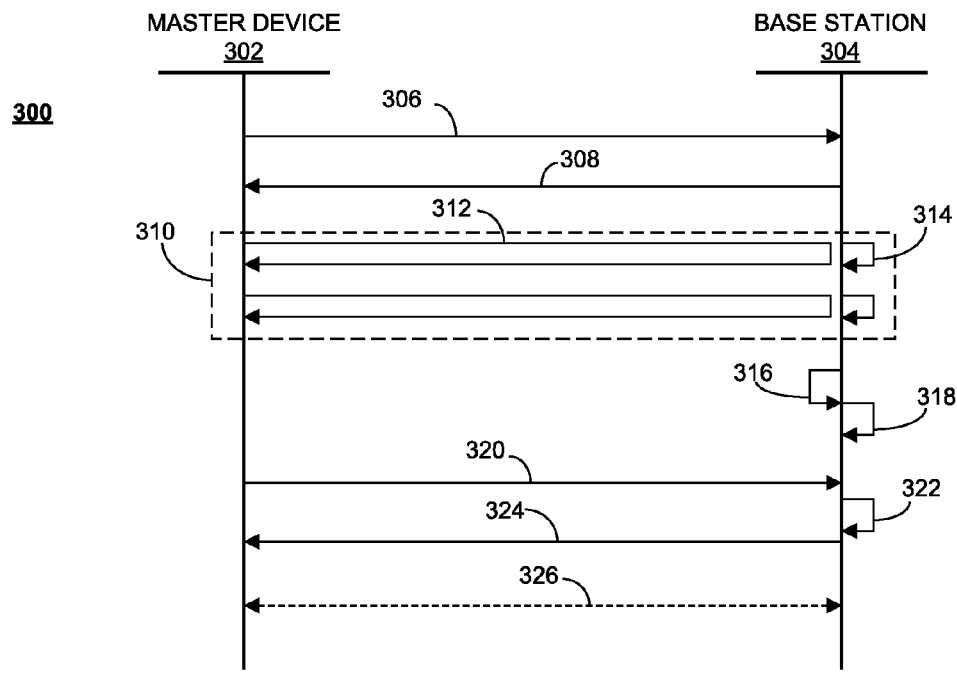
FIG. 3 shows a signal flow diagram for a master device de-subscribing itself from a base station, in accordance with an embodiment.

FIG. 3 shows an example of a signal flow diagram 300 for a master device 302 de-subscribing itself from a base station 304, in accordance with an embodiment. The master device 302 initiates the process by requesting 306 operation as a master device. If no other device registered with the base station 304 is presently operating as a master device, the base station 304 can grant 308 the request 306. Alternatively, a remote telephony device can be pre-set to operate as a master device, in which case the user of the remote telephony device only needs to enter master mode at the master device. Once master mode is commenced, the master device 302 can send command information 310 to the base station 304 over a link of the local wireless telephony interface. In one embodiment, as each button is pressed at the master device 302, the button press information is transmitted 312 to the base station 304, which echoes the button press information back to the master device 302. The base station 304 also maintains 314 a command state as each button press is received. The command information can be buffered until a complete command is received, and then the command can be executed.

In the present example the command being sent to the base station 304 by the master device 302 is a de-subscribe command and the master device 302 is requesting the base station 304 de-subscribe the master device 302. When a device is de-subscribed, it is generally ignored by the base station 304. Furthermore, a remote telephony device can maintain an indication of an identifier of the base station to which it is subscribed. A de-subscribe command can result in the remote telephony device being de-subscribed to delete the identifier of the base station to which it is subscribed. In the process of transmitting the command, the base station 304, in one embodiment, can recognize the de-subscription command and transmit a list of subscribed devices to the master device 302, allowing the master device 302 to pick from the list of devices and pick the identifier of the master device 302. Every remote telephony device operating in a local wireless telephony system has an identifier the uniquely identifies it in the local wireless telephony system. Identifiers can be assigned by the base station, or they can be programmed into each remote telephony device when the remote telephony device is manufactured. The base station 304 determines that the de-subscribe command target identifier and the master device identifier are the same. In order to prevent inadvertently de-subscribing the master device 302, a conflict handling process of the base station 304 operates to ensure that the de-subscription command is deliberate. In order to complete the de-subscription operation, the conflict handling process must be resolved. The way in which it is resolved depends upon the form of the conflict handling process. In one embodiment, the conflict handling process can be instruction code that ordinarily prevents the master device 302 from de-subscribing itself, which is overridden by other instruction code designed to intercept the target identifier so as to prevent operation of the conflict handling process.

In another embodiment, the conflict handling process can be a prompting process that requests the user to confirm that they intend to de-subscribe the master device 302. In another embodiment, the command structure can be designed so that in order to de-subscribe the master device 302, the user of the master device 302 must use a special command. The special command may be protected, such as by requiring the user to enter a password. In another embodiment, upon determining the de-subscribe command target identifier is the same as the master device identifier, the base station 304 can request the user of the master device 302 provide a correct password in order to override the conflict handling process.

Upon successfully overriding the conflict handling process, the base station 304 de-subscribes 318 the master device 302. Once the master device 302 is de-subscribed, the base station 304 can allow the master device 302 to continue to operate as the master device and perform master mode operations, or it can terminate communication with the master device 302. If the master device 302 is allowed to continue to perform master mode operations, it can issue further commands 320, which can be performed or executed 322 and acknowledged 324 by the base station 304. The master device 302 or the base station 304 can terminate 326 the link responsive to any of several situations, including the master device 302 hanging up or otherwise purposefully terminating the link responsive to user input, or the base station 304 can terminate the link responsive to the lapse of a period of inactivity other pre-selected time period.

In at least one embodiment, the de-subscribing 318 can occur upon the link being terminated 326, rather than before, where the master device 302 continues to be listed in the registry of the base station 304 as being registered until the link is terminated 326. Once the link is terminated, master mode operation is also terminated, and the base station 304 can then ignore any communication attempts from the device that was formerly operating as the master device. Internally, the base station 304 can clear its registry of both the device identifier and the master mode indicator that corresponded to the device formerly operating as the master device. The base station 304 can then grant other devices master mode operation.

Figure 4:
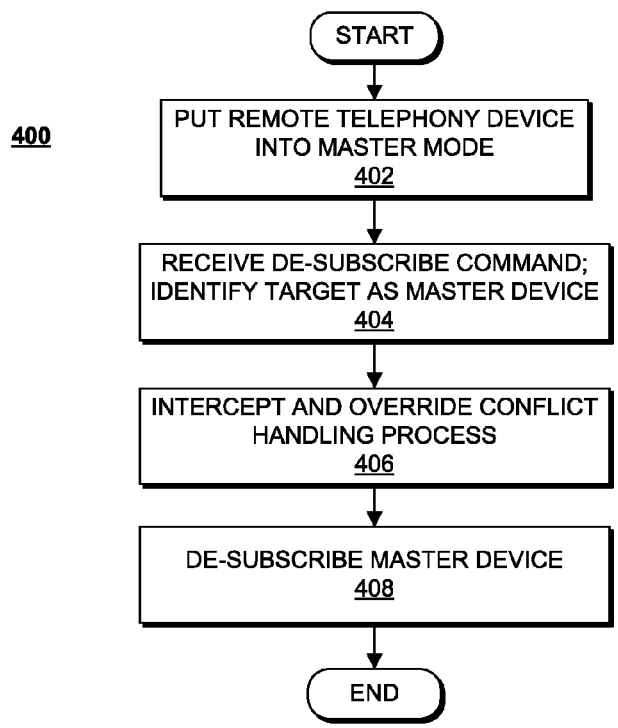
FIG. 4 shows a flow chart diagram of a process for de-subscribing a master device from a base station in a local wireless telephony system, in accordance with an embodiment.

FIG. 4 shows an example of a flow chart diagram of a process 400 for de-subscribing a master device from a base station in a local wireless telephony system, in accordance with an embodiment. The process 400 pictured here may be applicable to the embodiments described above in relation to FIGS. 1-3, but it is understood that the process 400 can be carried out with other suitable systems and arrangements. Moreover, the process 400 may include other steps that are not shown here, and in fact, the process 400 is not limited to including every step shown in FIG. 4. The steps that are illustrated here as part of the process 400 are not limited to this particular chronological order, either.

At the start of the process 400, a remote telephony device is registered or subscribed to the base station, which allows the remote telephony device to interface with the base station for communication service, such as telephony voice communication. The remote telephony device first commences master mode operation 402. The remote telephony device can be put into master mode to become a master device by any of a variety of processes, including requesting master mode operation or status with the base station. The master device provides a remote control type interface for the user of the master device to command the base station to conduct various operations. Commands and other information can be entered or commenced from the master device by the user of the master device.

The base station receives a de-subscribe command from the master device indicating the device to be de-subscribed is the master device itself 404. The base station identifies that an identifier of the intended target of the de-subscribe command is the same as an identifier of the master device. The identifiers can be unique serial numbers assigned to each device upon manufacture, can be aliases mapped to such identifiers, or they can be identifiers assigned to the devices upon subscribing to the base station. When the de-subscribe command target identifier and the master device identifier are the same, a conflict handling process must be resolved 406 in order for the master device to be de-subscribed 408. The conflict handling process assures that the de-subscribe operation is deliberate, and can be implemented in a variety of ways, as taught herein. Once the conflict handling process is successfully resolved, as determined by the base station, and the master device is de-subscribed, the method can end. The master device can remain connected to the base station via a link of the local wireless telephony interface provided by the base station and continue operating as a master device. The base station can de-subscribe the master device, but retain an indication that the master device continues to be identified as the master device until the link is terminated.

Figure 5:
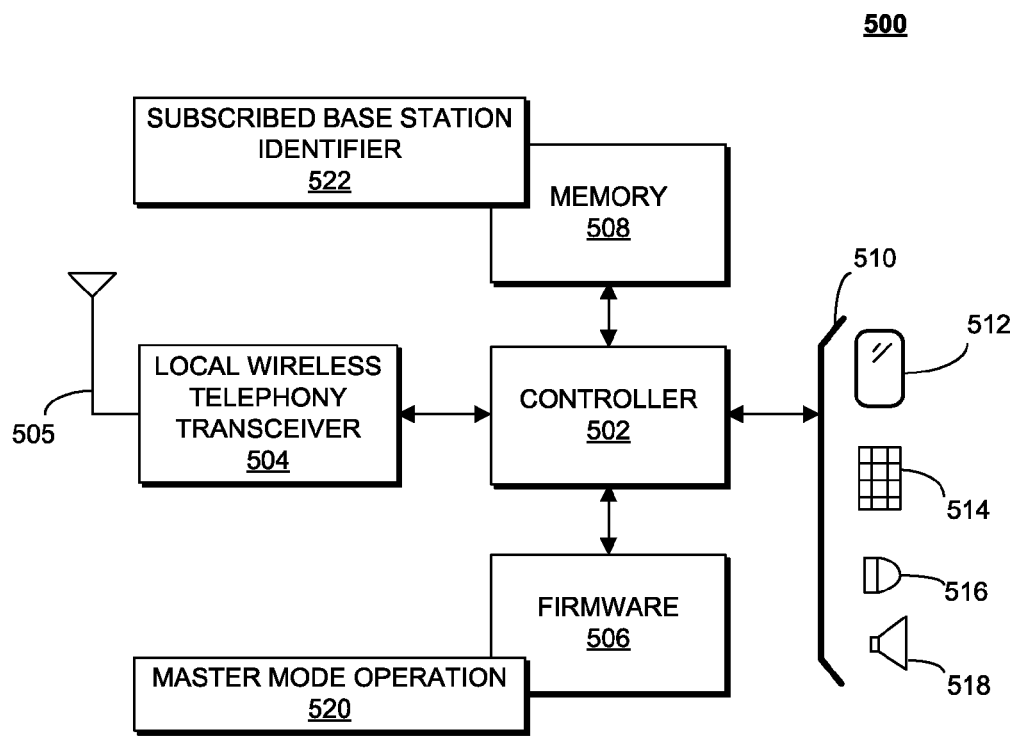
FIG. 5 shows a block schematic diagram of a remote telephony device capable of operating as a master device that can de-subscribe itself from a base station of a local wireless telephony system, in accordance with an embodiment.

FIG. 5 shows a block schematic diagram of a remote telephony device 500 capable of operating as a master device that can de-subscribe itself from a base station of a local wireless telephony system, in accordance with an embodiment. The remote telephony device 500 comprises a controller 502 that can be a conventional microcontroller or microprocessor capable of executing instruction code as well as performing logic input and output operations. The controller 502 is operably coupled to a local wireless telephony transceiver 504. The local wireless transceiver contains radio circuitry for generating, modulating, transmitting, receiving, and demodulating signals over a prescribed local wireless telephony interface. Accordingly, the transceiver 504 can contain frequency generation circuitry, frequency stability circuitry, amplifiers, filter components, logic components for performing digital modulation and demodulation, and so on. The transceiver is operably coupled to an antenna 505 for transmitting and receiving radio signals.

The remote telephony device 500 further comprises firmware 506 that is operably coupled to the controller 502 and that includes operating instruction code stored in a tangible non-transitory machine readable storage medium. The storage medium can be, for example, a semiconductor memory device such as a read only memory (ROM), a reprogrammable memory such as an electrically erasable programmable memory (EEPROM), or a flash memory, among other example. The firmware contains instruction code that, when executed by the controller 502 causes the remote telephony device to operate in accordance with the teaching of the present disclosure, in addition to other operations. The controller is further operably coupled to a memory 508 which can be a runtime memory such as a random access memory (RAM) but that can further include non-volatile memory components for the long term storage of data such as phone numbers, and other information that a user may wish to store in the remote telephony device 500 as well as other information used by the remote telephony device 500 for operation that is generally not used by a user.

The remote telephony device can further include a user interface 510 that can comprise, for example, a graphical display 512 for displaying information visually to a user, and a keypad and/or other buttons for receiving input from a user. The user interface further includes a microphone assembly 516 and a speaker assembly 518. The microphone and speaker assemblies 515, 518 provide an acoustic audio interface for the user of the remote telephony device 500 so that the user can listen to and talk to other parties. The microphone assembly 516 converts received acoustic audio signals into electrical audio signals which can be processed, formatted, and transmitted by the remote telephony device 500 to a base station over the local wireless telephony interface. Similarly, the speaker assembly 518 can play electrical audio signals to produce acoustic audio signals that can be heard by the user.

The firmware 506 contains master mode operation instruction code 516 which allows the remote telephony device 500 to operate in a master mode in accordance with the teachings of the present disclosure. The remote telephony device further maintains an indication or identifier 516 of the base station to which it is presently subscribed (if any). A user of the remote telephony device 500, via the user interface 510, can cause the remote telephony device 500 to commence operation in master mode. The remote telephony device 500, pursuant to master mode operation instruction code 516, first requests master mode operation from the base station to which it is subscribed, as indicated by the identifier 516. Upon a grant of mater mode operation, the remote telephony device 500 can then be used by the user to issue master commands to the base station, including a de-subscription command indicating the remote telephony device 500 as the target of the de-subscription command. Upon successful resolution of the base station's conflict handling process, the base station can grant the de-subscription command, causing the remote telephony device 500 to delete the identifier 516. The identifier 516 can be deleted immediately, or it can be deleted upon termination of master mode operation, or upon termination of communication with the base station.

This description can be embodied in other forms without departing from the spirit or essential attributes thereof. Accordingly, reference should be made to the following claims, rather than to the foregoing specification, as indicating the scope of the invention.

What is claimed is:

1. A method of controlling de-subscription in a local wireless telephony system, comprising:
    receiving, at a base station of the local wireless telephony system over a link of a local wireless telephony interface of the base station, a request to operate as a master device from a remote telephony device that is subscribed to the base station;
    transmitting a grant to operate as a master device to the remote telephony device from the base station over the local wireless telephony interface and recording an indication at the base station that the remote telephony device is a master device;
    receiving a command from the master device at the base station;
    determining that the command includes a de-subscription command and includes a de-subscription target device identifier that is the same as a master device identifier of the master device;
    resolving a conflict handling process at the base station responsive to determining the de-subscription target device identifier and the master device identifier are the same, wherein the conflict handling process prevents de-subscription of the master device until the conflict handling process is resolved; and
    de-subscribing the master device from the base station subsequent to resolving the conflict handling process, performed by the base station.

2. The method of claim 1, further comprising continuing to allow the master device to perform master operations with the base station subsequent to de-subscribing the master device until the link is terminated.

3. The method of claim 2, wherein the link is terminated automatically upon expiration of a pre-selected time period of inactivity of the link.

4. The method of claim 2, wherein the link is terminated upon receiving a master mode termination command from the master device.

5. The method of claim 1, wherein the local wireless telephony interface conforms substantially to a Digital Enhanced Cordless Telephone (DECT) standard.

6. The method of claim 1, wherein resolving the conflict handling process comprises requesting a confirmation of the de-subscription command responsive to the conflict handling process.

7. The method of claim 1, wherein de-subscribing the master device is not performed until the link is terminated.

8. The method of claim 1, wherein resolving the conflict handling process comprises the base station requesting the master device to provide a password.

9. The method of claim 1, wherein resolving the conflict handling process comprises prompting the master device to confirm the de-subscription command.

10. The method of claim 1, wherein resolving the conflict handling process comprises determining that the de-subscription command is a special command accessible only by password at the master device.

11. A base station of a local wireless telephony system, comprising:
- a controller operable to execute instructions contained in firmware of the base station;
- a transceiver operably connected to the controller that establishes a local wireless telephony interface;
- a registry operable to record identifiers of remote telephony device that are subscribed to the base station;
- wherein the firmware contains instruction code for a conflict handling process that is invoked by the base station upon the base station receiving a de-subscription command from a master device indicating the master device is attempting to de-subscribe itself, and wherein upon successful resolution of the conflict handling process, the base station de-subscribes the master device from the base station.

12. The base station of claim 11, wherein the transceiver establishes the local wireless telephony interface in substantial conformance with a Digital Enhanced Cordless Telephone (DECT) standard.

13. The base station of claim 11, wherein the conflict handling process causes the base station to prompt the master device for a password to verify the de-subscription command.

14. The base station of claim 11, wherein the conflict handling process determines the de-subscription command is a special command only accessible at the master device by an authorized user.

15. The base station of claim 11, wherein the base station allows the master device to continue to operate as a master device subsequent to de-subscribing the master device.

16. The base station of claim 11, wherein the base station de-subscribes the master device upon termination of a link of the local wireless telephony interface used to convey the de-subscription command.

17. The base station of claim 11, wherein the de-subscription command is received as a sequence of button presses from the master device, and wherein the base station echoes each button press back to the master device as it is received by the base station.

18. A method of de-subscribing a remote telephony device operating as a master device from a base station, comprising:
- receiving a command sequence at the base station from the master device;
- determining at the base station that the command sequence includes a de-subscription command;
- determining at the base station that a target identifier of the de-subscription command is the same as an identifier of the master device;
- resolving a conflict handling process responsive to determining the target identifier of the de-subscription command is the same as the identifier of the master device; and
- deleting the identifier of the master device from a subscription registry of the base station.

19. The method of claim 18, wherein deleting the identifier occurs in response to a link of a local wireless telephony interface of the base station over which the master device transmitted the de-subscription command is terminated.

20. The method of claim 18, wherein, subsequent to deleting the identifier, the method further comprises the base station allowing the master device to continue operating in a master mode until a link of a local wireless telephony interface of the base station over which the master device transmitted the de-subscription command is terminated.

21. A remote telephony device, comprising:
- a controller;
- a transceiver operably coupled to the controller and operable to communicate with a base station over a local wireless telephony interface;
- firmware operably coupled to the controller and containing instruction code for operating the remote telephony device in a master mode;
- wherein the remote telephony device is configured to, while operating in the master mode, issue a de-subscription command to the base station, the de-subscription command targeting the remote telephony device, upon an indication that the de-subscription command has been granted the remote telephony device is configured to delete an identifier corresponding to the base station from a subscribed base station identifier memory location in the remote telephony device.

22. The remote telephony device of claim 21, wherein the remote telephony device ceases communication with the base station in response to the indication that the de-subscription command has been granted.

23. The remote telephony device of claim 21, wherein the remote telephony device continues operating in the master mode subsequent to the indication that the de-subscription command has been granted.

24. The remote telephony device of claim 21, wherein the remote telephony device prompts a user of the remote telephony device to confirm the de-subscription command.

* * * * *